US008079035B2

(12) United States Patent
Hankins et al.

(10) Patent No.: US 8,079,035 B2
(45) Date of Patent: Dec. 13, 2011

(54) DATA STRUCTURE AND MANAGEMENT TECHNIQUES FOR LOCAL USER-LEVEL THREAD DATA

(75) Inventors: Richard A. Hankins, San Jose, CA (US); Gautham N. Chinya, Hillsboro, OR (US); Hong Wang, Fremont, CA (US); David K. Poulsen, Champaign, IL (US); Shirish Aundhe, Beaverton, OR (US); John P. Shen, San Jose, CA (US); Sanjiv M. Shah, Champaign, IL (US); Baiju V. Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1208 days.

(21) Appl. No.: 11/321,763

(22) Filed: Dec. 27, 2005

(65) Prior Publication Data

US 2007/0150900 A1 Jun. 28, 2007

(51) Int. Cl.
*G06F 9/46* (2006.01)
*G06F 9/44* (2006.01)
*G06F 13/24* (2006.01)

(52) U.S. Cl. ......................... 718/108; 712/244; 710/260

(58) Field of Classification Search .................. 718/108; 709/210; 712/229

See application file for complete search history.

(56) References Cited

U.S. PATENT DOCUMENTS 5,255,379 A * 10/1993 Melo ............................. 711/202
5,606,696 A * 2/1997 Ackerman et al. ............ 718/108
5,692,193 A * 11/1997 Jagannathan et al. ........ 718/106
5,872,963 A * 2/1999 Bitar et al. .................... 712/233
6,061,709 A * 5/2000 Bronte .......................... 718/103
6,317,872 B1 * 11/2001 Gee et al. ...................... 717/152
6,418,460 B1 * 7/2002 Bitar et al. .................... 718/108
6,654,781 B1 * 11/2003 Browning ..................... 718/104
6,766,515 B1 7/2004 Bitar et al.
6,865,579 B1 * 3/2005 Shaylor ..................... 707/103 R
6,895,583 B1 * 5/2005 Koning ......................... 718/100
7,360,218 B2 * 4/2008 Accapadi et al. ............. 718/102
7,380,039 B2 * 5/2008 Miloushev et al. ........... 710/244
2003/0088604 A1 * 5/2003 Kuck et al. ........................ 709/1

(Continued)

FOREIGN PATENT DOCUMENTS

WO 2007075339 A1 7/2007

OTHER PUBLICATIONS

Wang et al. "ChucK: A Concurrent, On-the-fly, Audio Programming Language". In Proceedings of the 2003 International Computer Music Conference.*

(Continued)

*Primary Examiner* — Emerson Puente
*Assistant Examiner* — Adam Lee
(74) *Attorney, Agent, or Firm* — Barre Law Firm, PLLC

(57) ABSTRACT

Data structure creation, organization and management techniques for data local to user-level threads are provided. In one embodiment, a method includes generating, for a user-level thread ("shred") to run on a thread unit that is not managed by an operating system ("OS"), a storage area for local data and maintaining state in the storage area across a context switch from the thread unit that is not managed by the OS to a second thread unit that is managed by the OS. Other embodiments are also described and claimed.

23 Claims, 13 Drawing Sheets

U.S. PATENT DOCUMENTS

| | | | | |
|---|---|---|---|---|
| 2005/0223199 | A1 * | 10/2005 | Grochowski et al. | 712/235 |
| 2006/0064687 | A1 * | 3/2006 | Dostert | 718/1 |
| 2006/0075404 | A1 * | 4/2006 | Rosu et al. | 718/100 |
| 2006/0150184 | A1 * | 7/2006 | Hankins et al. | 718/100 |
| 2006/0224858 | A1 * | 10/2006 | Wang et al. | 711/202 |
| 2007/0006231 | A1 * | 1/2007 | Wang et al. | 718/100 |
| 2007/0074217 | A1 * | 3/2007 | Rakvic et al. | 718/102 |
| 2007/0124732 | A1 * | 5/2007 | Lia et al. | 718/102 |

OTHER PUBLICATIONS

Anderson, et al. "Scheduler Activations: Effective Kernel Support for the User-Level Management of Parallelism". University of Washington ACM Transactions on Computer Systems, vol. 10, No. 1, Feb. 1992, pp. 53-79.*

Barekas, V.K. et al., "Nanothreads vs. Fibers for the Support of Fine Grain Parallelism on Windows NT/ 2000 Platforms", Lecture Notes in Computer Science, vol. 1940, 2000, pp. 146-159, XP002396133. ISSN: 0302-9743.

Mayes, K.R. et al., "User-Level Threads on a General Hardware Interface", Operating Systems Review, ACM, vol. 29, No. 4, Oct. 1, 1995, pp. 57-62, XP000555163. ISSN: 0163-5980.

International Search Report for PCT/US2006/047533 mailed Jun. 4, 2007, 12 pages.

International Preliminary report on patentability for PCT Application No. PCT/US2006/047533, Mailed on Jul. 10, 2008, 7 pages.

Sullivan and Russinovich, Inside Microsoft® Windows® 2000, Third Edition, "Chapter 6: Processes, Threads and Jobs", 8/16/200, printed from .microsoft.com/mspress/books/sampchap/4354b.asp.

Gulbrandsen, "How do Windows NT System Calls Really Work?", Aug. 26, 2004, printed from codeguru.com/Cpp/W-P/system/devicedriverdevelopment/article.php/c8035/.

Wang et al—U.S. Appl. No. 11/173,326, filed Jun. 30, 2005—A Mechanism for Instruction Set Based Thread Execution on a Plurality of Instruction Sequencers.

Hankins et al—U.S. Appl. No. 11/027,445, filed Dec. 30, 2004—Mechanism to Schedule Threads on OS-Sequestered Sequencers Without Operating System Intervention.

Chinya et al—U.S. Appl. No. 11/129,607, filed May 13, 2005—Transparent Support for Operating System Services for a Sequestered Sequencer.

* cited by examiner

DATA STRUCTURE AND MANAGEMENT TECHNIQUES FOR LOCAL USER-LEVEL THREAD DATA

BACKGROUND

1. Technical Field

The present disclosure relates generally to information processing systems and, more specifically, to managing data local to user-level threads in a multi-sequencer multi-threading system.

2. Background Art

In order to increase performance of information processing systems, such as those that include microprocessors, both hardware and software multi-threading techniques have been employed. Increasingly, multi-threading is supported in hardware. For instance, in one approach, processors in a multi-processor system, such as a chip multiprocessor ("CMP") system, may each act on one of the multiple software threads concurrently. In another approach, referred to as simultaneous multi-threading ("SMT"), a single physical processor is made to appear as multiple logical processors to operating systems and user programs. For SMT, multiple software threads can be active and execute simultaneously on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT and/or CMP systems, an operating system application may control scheduling and execution of the software threads on thread execution resource(s). However, other thread execution resources that are not controlled by the operating system may also be available to a programmer and may be controlled by user-level code. Common operating systems do not provide for data structures to maintain local data for user-level threads that may execute on such resources.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of data structures and techniques for managing data local to user-level threads in a multi-sequencer multi-threading system.

DETAILED DESCRIPTION

The following discussion describes selected embodiments of methods, systems, data structures, apparatuses and mechanisms to manage local data for user-level threads that are neither created nor managed by the operating system but instead are created and managed by user-level code.

Such user-level threads, sometimes referred to herein as "shreds", are sequences of instructions that a programmer may cause to be executed based on instructions in user-level code. Multiple shreds associated with the same thread may execute concurrently. For at least one embodiment, the shreds are scheduled to run on available hardware resources (such as, e.g., by a scheduler in a software library or otherwise residing in user space) without intervention of an operating system. The embodiments described herein may be utilized with single-core or multi-core multi-threading systems.

As used herein, a thread unit, also interchangeably referred to herein as a hardware thread context or "sequencer", may be any physical or logical unit capable of executing a thread or shred.

In the following description, numerous specific details such as processor types, multi-threading environments, system configurations, data structures and specific operating system processing have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

Figure 1:
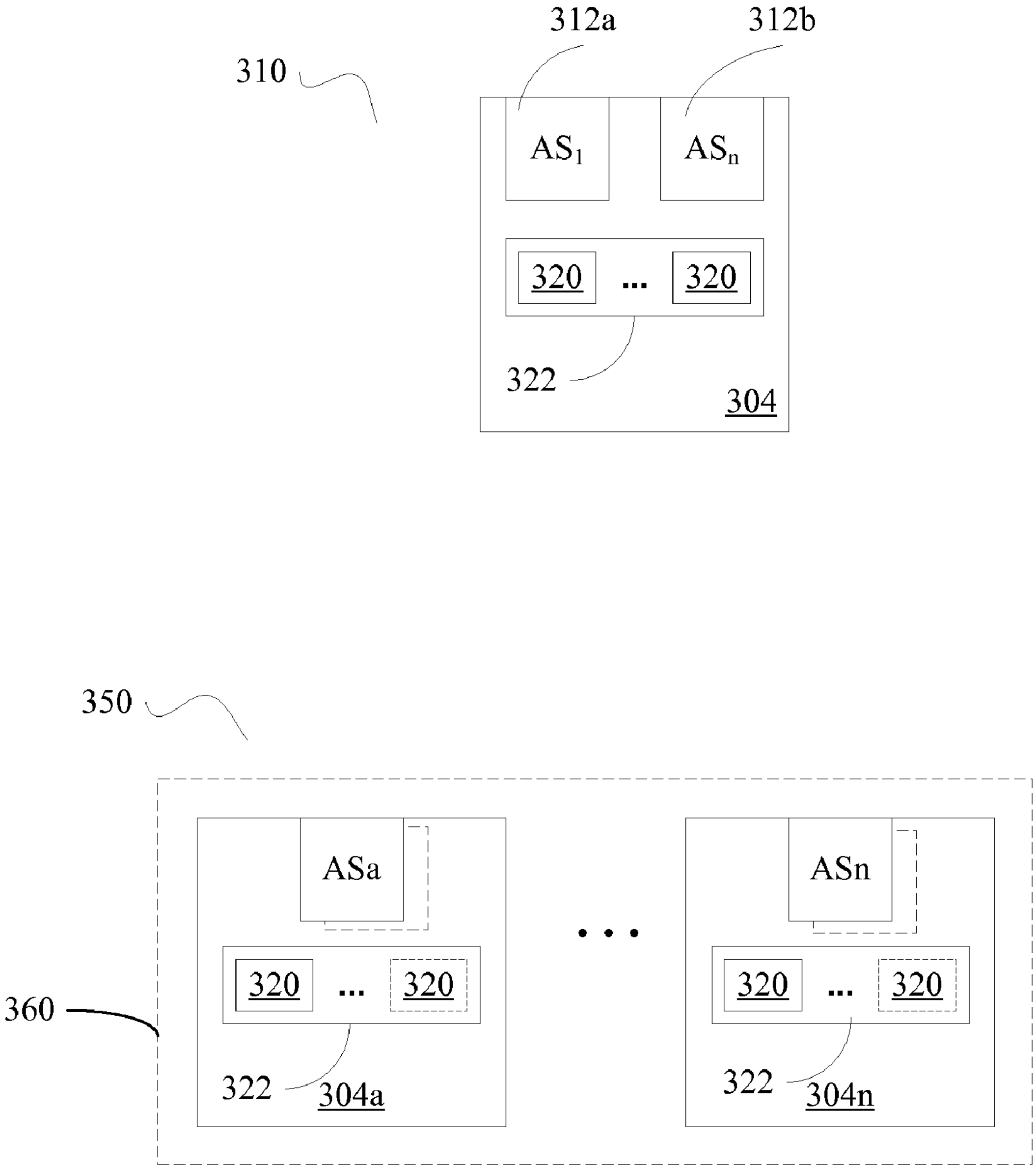
FIG. 1 is a block diagram illustrating various embodiments of multi-sequencer systems.

FIG. 1 is a block diagram illustrating selected hardware features of embodiments 310, 350 of a multi-sequencer system that supports user-level control of threads. FIG. 1 illustrates selected hardware features of a single-core multi-sequencer multi-threading environment 310. FIG. 1 also illustrates selected hardware features of a multiple-core multi-threading environment 350, where each sequencer is a separate physical processor core.

In the single-core multi-threading environment 310, a single physical processor 304 is made to appear as multiple logical processors (not shown), referred to herein as $LP_1$ through $LP_n$, to operating systems and user programs. Each logical processor $LP_1$ through $LP_n$ maintains a complete set of the architecture state $AS_1$-$AS_n$, respectively. The architecture state 312*a*, 312*b* may include, for at least one embodiment, data registers, segment registers, control registers, debug registers, and most of the model specific registers.

The logical processors $LP_1$-$LP_n$ share most other resources of the physical processor 304, such as caches, execution units, branch predictors, control logic and buses. Although such features may be shared, each thread context in the multi-threading environment 310 can independently generate the next instruction address (and perform, for instance, a fetch from an instruction cache, an execution instruction cache, or trace cache).

Thus, the processor 304 includes logically independent next-instruction-pointer and fetch logic 320 for each thread context, even though the multiple logical sequencers may be implemented in a single physical fetch/decode unit 322. The next-instruction-pointer and fetch logic 320 is to determine the next instruction to be executed for the given thread or shred.

For a single-core embodiment, a sequencer thus may be a logical thread unit. In such case, the term "sequencer" encompasses at least the next-instruction-pointer and fetch logic 320 for a thread context, along with at least some of the associated architecture state, AS 312, for that thread context. It should be noted that the sequencers of a single-core multi-threading system 310 need not be symmetric. For example, two logical sequencers for the same physical core 304 may differ in the amount of architectural state information that they each maintain.

A single-core multithreading system can implement any of various multithreading schemes, including simultaneous multithreading (SMT), switch-on-event multithreading (SoeMT) and/or time multiplexing multithreading (TMUX). When instructions from more than one hardware thread contexts (or logical processor) run in the processor concurrently at any particular point in time, it is referred to as SMT. Otherwise, a single-core multithreading system may implement SoeMT, where the processor pipeline is multiplexed between multiple hardware thread contexts, but at any given time, only instructions from one hardware thread context may execute in the pipeline. For SoeMT, if the thread switch event is time based, then it is TMUX.

Thus, for at least one embodiment, the multi-sequencer system 310 is a single-core processor 304 that supports concurrent multi-threading. For such embodiment, each sequencer is a logical processor having its own next-instruction-pointer and fetch logic 320 and its own architectural state information 312, although the same execution resources of the single processor core 304 may be shared among concurrently-executing threads so that the same core 304 executes all instructions for the concurrent threads.

FIG. 1 also illustrates at least one embodiment of a multi-core multi-threading system 350. Such a system 350 includes two or more separate physical processors 304*a*-304*n* that is each capable of executing a different thread/shred such that execution of at least portions of the different threads/shreds may be ongoing at the same time. Each processor 304*a* through 304*n* includes a physically independent fetch unit 322 to fetch instruction information for its respective thread or shred. For an embodiment where each processor 304*a*-304*n* executes a single thread/shred, the fetch/decode unit 322 implements a single next-instruction-pointer and fetch logic 320.

However, for at least one embodiment each processor 304*a*-304*n* supports multiple thread contexts; that is, each processor 304*a*-304*n* may be a multi-threaded single core processor such as that shown in embodiment 310. For such embodiment, the fetch/decode unit 322 of each core 304 in the system 350 implements distinct next-instruction-pointer and fetch logic 320 for each supported thread context, and each thread context maintains a separate copy of the architecture state (AS). The optional nature of additional next-instruction-pointer and fetch logic 320 and additional copies of the architecture state in a multiprocessor environment 350 are denoted by dotted lines in FIG. 1.

For at least one embodiment of the multi-core system 350 illustrated in FIG. 1, each of the sequencers may be a processor core 304, with the multiple cores 304*a*-304*n* residing in a single chip package 360. As is described immediately above, each core 304*a*-304*n* may be either a single-threaded or multi-threaded processor core. The chip package 360 is denoted with a broken line in FIG. 1 to indicate that the illustrated single-chip embodiment of a multi-core system 350 is illustrative only. For other embodiments, processor cores of a multi-core system may reside on separate chips. That is, the multi-core system may be a multi-socket symmetric multiprocessing system.

For ease of discussion, the following discussion focuses on embodiments of the multi-core system 350. However, this focus should not be taken to be limiting, in that the mechanisms described below may be performed in either a multi-core or single-core multi-sequencer environment.

Figure 2:
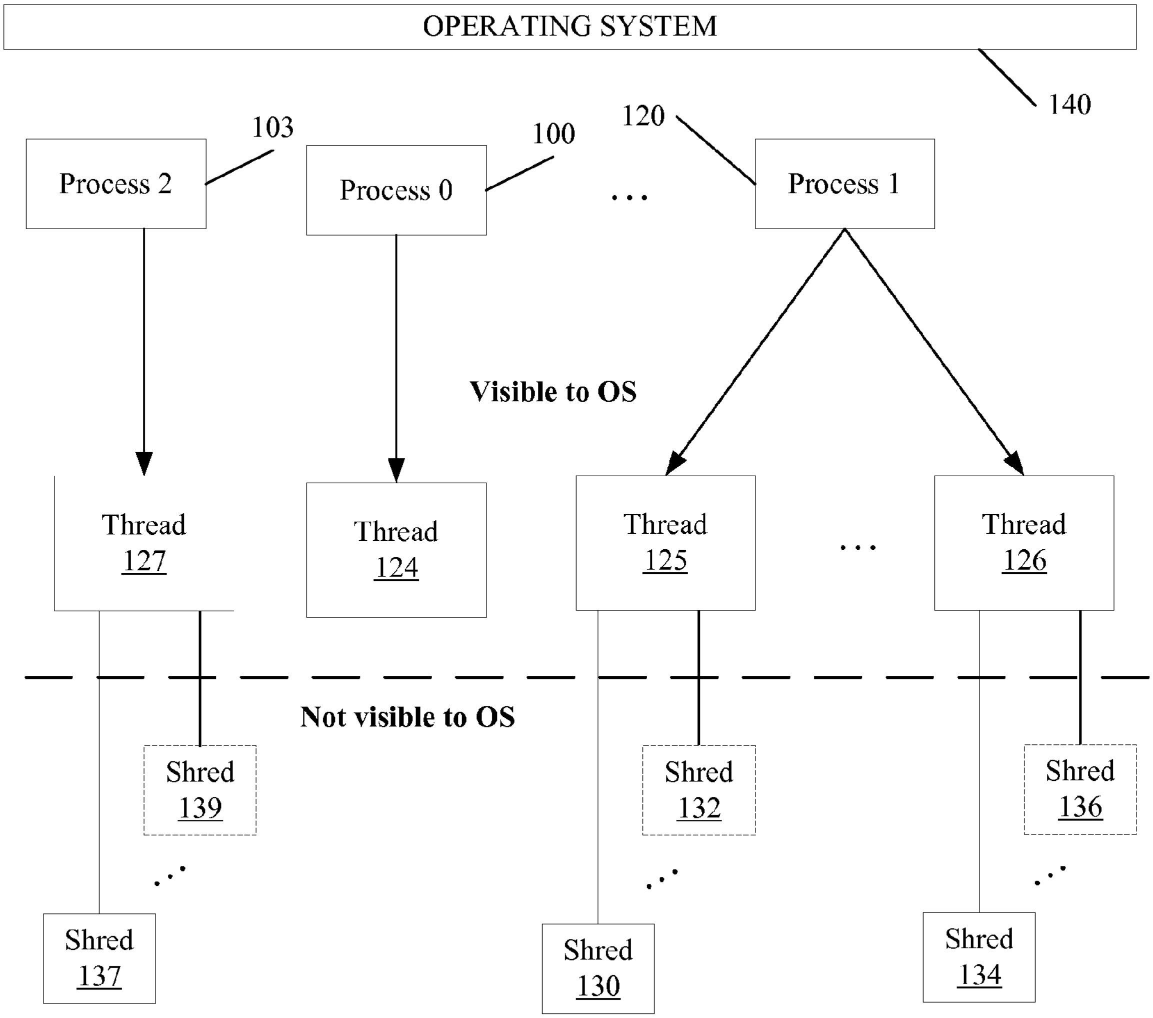
FIG. 2 is a block diagram presenting a graphic representation of a general parallel programming approach for a multi-sequencer system.

FIG. 2 is a block diagram illustrating a graphic representation of a parallel programming approach on a multi-sequencer multi-threading system. A shared-memory multiprocessing paradigm may be used in an approach referred to as parallel programming. According to this approach, an application programmer may express parallelism in a software program, sometimes referred to as an "application" or "process," through multiple threads to be run concurrently. All threads of the same software program ("process") share a common logical view of memory.

FIG. 2 illustrates processes 100, 103, 120 that are visible to an operating system ("OS") 140. These processes 100, 103, 120 may be different software application programs, such as, for example, a word processing program, a graphics program, and an email management program. Commonly, each process operates in a different virtual address space.

The operating system ("OS") 140 is commonly responsible for managing the user-defined tasks for a process. While each process has at least one task (see, e.g., process 0 and process 2, bearing reference numerals 100 and 103, respectively), others may have more than one (e.g., Process 1, bearing reference numeral 120). The number of processes illustrated in FIG. 2, as well as the number of user-defined tasks for each process, should not be taken to be limiting. Such illustration is for explanatory purposes only.

FIG. 2 illustrates that a distinct thread 125, 126 for each of the user-defined tasks associated with a process 120 may be created by operating system 140, and the operating system 140 may map the threads 125, 126 to thread execution resources. Similarly, a thread 127 for the user-defined task associated with process 103 may be created by the operating system 140; so may a thread 124 for the user-defined task associated with process 0 (100).

The OS 140 is commonly responsible for scheduling these threads 124, 125 . . . 126, 127 for execution on the execution resources. The threads associated with the same process have the same virtual memory address space.

Because the OS 140 is responsible for creating, mapping, and scheduling threads, the threads 124, 125 . . . 126, 127 are "visible" to the OS 140. In addition, embodiments of the present invention comprehend additional user-level threads

130-139 that are not visible to the OS 140. That is, the OS 140 does not create, manage, or otherwise control these additional user-level threads 130-139.

These additional threads, which are neither created nor controlled by the OS 140, and may be scheduled to execute concurrently with each other, are sometimes referred to herein as "shreds" 130-139 in order to distinguish them from OS-visible threads and to further distinguish them from other user-level threads that may not be executed concurrently with each other for the same OS-visible thread. That is, multiple shreds that are associated with the same OS-visible thread may execute concurrently with each other.

The shreds are created and managed by user-level programs (referred to as "shredded programs") and may be scheduled to run on sequencers that are sequestered from the operating system. For example, the OS-managed thread 125 illustrated in FIG. 2 may execute on one sequencer, not shown, that is visible to the OS, while each of the active shreds 130-132 may execute on other, OS-sequestered, sequencers (see, e.g., "seq 1"-"seq 4", respectively of FIG. 3). For sequencers that are sequestered from the OS, streams of instructions are scheduled for execution by a user-level scheduler. An OS-sequestered sequencer is thus managed by user-level applications, rather than the OS, and is therefore referred to herein as an "application managed sequencer" or "AMS".

FIG. 2 illustrates one process 103 associated with one OS-scheduled thread 127 and also illustrates another process 120 associated with two or more threads 125-126. In addition, each process 103, 120 may additionally be associated with one or more shreds 137-139, 130-136, respectively. Dotted lines and ellipses are used in FIG. 2 to represent optional additional shreds.

The representation of two threads 125, 126 and four shreds 130-136 for Process 1 (120) and of one thread 127 and two shreds 137, 139 for Process 2 (103) is illustrative only and should not be taken to be limiting. Embodiments of the present invention do not necessarily impose an upper or lower bound on the number of threads or shreds associated with a process. Regarding a lower bound for threads, FIG. 2 illustrates that every process running at a given time is associated with at least one thread.

However, the threads need not necessarily be associated with any shreds at all. Thus, no lower bound is imposed for shreds. For example, Process 0 (100) illustrated in FIG. 2 is shown to run with one thread 124 but without any shreds at the particular time illustrated in FIG. 2.

Regarding an upper bound, the number of OS-visible threads associated with a process may be limited by the OS program. However, the upper bound for the cumulative number of shreds associated with a process is limited, for at least one embodiment, only by the number of shred execution resources (e.g. number of sequencers) available at a particular time during execution.

FIG. 2 illustrates that a second thread 126 associated with a process 120 may have a different number (n) of shreds associated with it than the first thread 125. The optional nature of additional shreds is denoted with ellipses and broken lines in FIG. 2.

The common logical view of memory that is associated with all threads for a program or process may be referred to herein as an "application image." For embodiments of the present invention, this application program image is also shared by shreds associated with a process.

Figure 3:
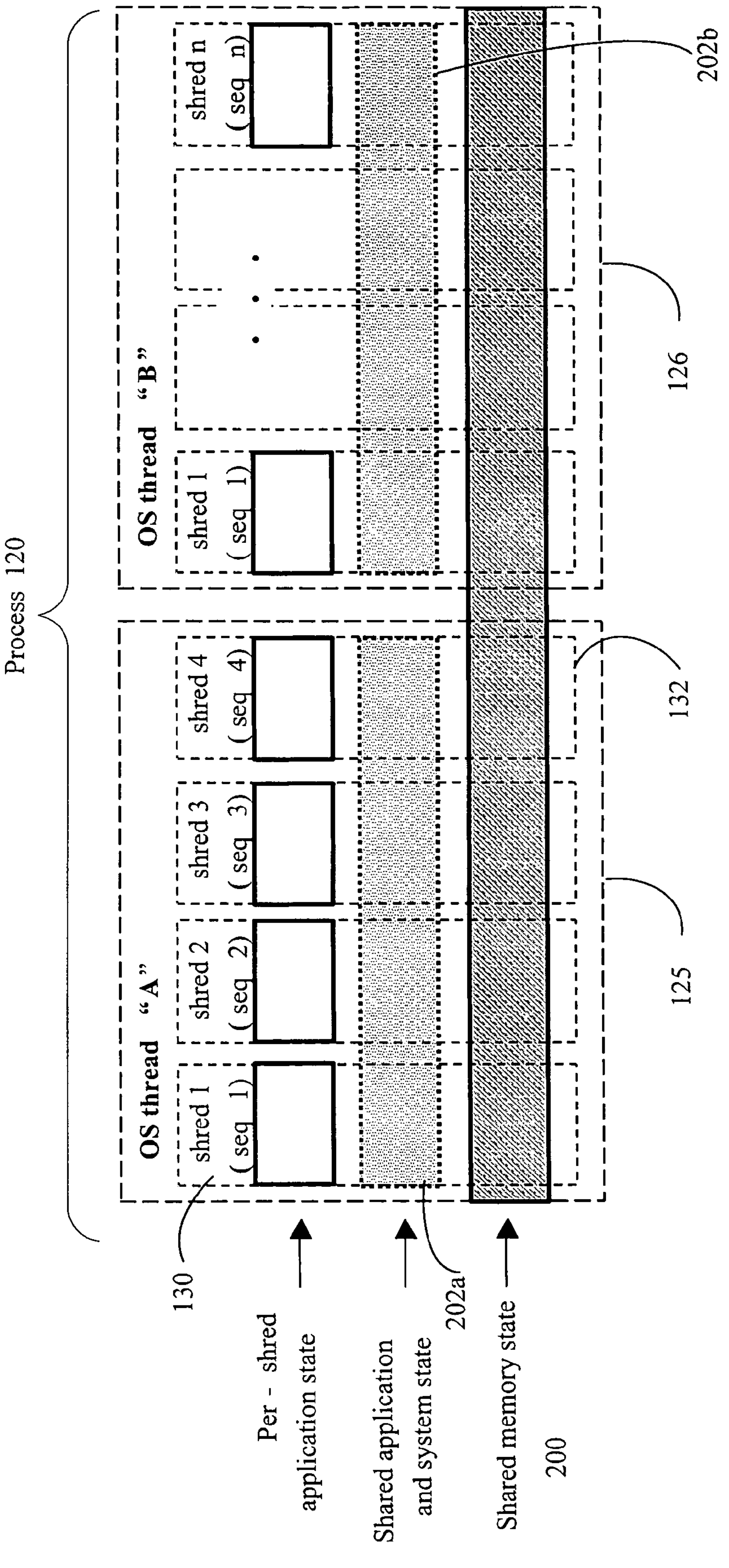
FIG. 3 is a block diagram illustrating shared memory and state among threads and user-level threads for at least one embodiment of user-level multithreading.

FIG. 3 is a block diagram illustrating an example of shared memory states among processes, threads, and shreds. FIG. 3 shows a graphical representation of a process 120, threads 124, 125, 126 and shreds 130-132 illustrated in FIG. 2. FIG. 3 is discussed below with reference to FIG. 2 as well.

FIG. 3 illustrates that a particular logical view 200 of memory is shared by all threads 125, 126 associated with a particular process 120. The OS-sequestered sequencers maintain a set of ring 0 states identical to those on the OS-visible sequencers. These shared ring-0 architectural states are typically those responsible for supporting a common shared memory address space between the OS-visible sequencer and OS-sequestered sequencers. For example, for an embodiment based on IA-32 architecture, CR0, CR2, CR3, CR4 are some of these shared ring-0 architectural states. Shreds thus share the same execution environment (virtual address map) that is created for the threads associated with the same process.

FIG. 3 illustrates that each thread 125, 126 has its own application and system state 202*a*, 202*b*, respectively. FIG. 3 illustrates that the application and system state 202 for a thread 125, 126 is shared by all shreds (for example, shreds 130-132) associated with the particular thread. For at least one embodiment, for example, all shreds associated with a particular shred may share the ring 0 states and at least a portion of the application states associated with the particular thread.

Accordingly, FIG. 3 illustrates that a system for at least one embodiment of the present invention may support a 1-to-many relationship between an OS-visible thread, such as thread 125, and the shreds 130-132 (which are not visible to the OS) associated with the thread. The shreds are not "visible" to the OS (see 140, FIG. 2) in the sense that a programmer, not the OS, may employ user-level techniques to create, synchronize and otherwise manage and control operation of the shreds. While the OS 140 is aware of, and manages, one or more threads 125 . . . 126, the OS 140 is not aware of, and does not manage or control, shreds. As used herein, the terms "thread" and "shred" include, at least, the concept of a set of instructions to be executed concurrently with other threads and/or shreds of a process. As used herein, a distinguishing factor between a thread (which is OS-controlled) and a shred (which is not visible to the operating system and is instead user-controlled), which are both instruction streams, lies in the difference of how scheduling and execution of the respective thread and shred instruction streams are managed. A thread is generated in response to a system call to the OS. The OS generates that thread and allocates resources to run the thread. Such resources allocated for a thread may include data structures that the operating system uses to control and schedule the threads.

In contrast, at least one embodiment of a shred is generated via a user level software "primitive" that invokes an OS-independent mechanism for generating and scheduling a shred that the OS is not aware of. A shred may thus be generated in response to a user-level software call. For at least one embodiment, the user-level software primitives may involve user-level (ring-3) instructions that invoke hardware or firmware to create a shred. The shred thus created may be scheduled by hardware and/or firmware and/or user-level software. The OS-independent mechanism may be software code that sits in user space, such as a software library. Thus, instead of relying on the operating system to manage the mapping between thread unit hardware and shreds, scheduler logic in user space may manage the mapping. A further discussion of user-level shredding instructions may be found in copending patent application U.S. patent Ser. No. 11/173,326, entitled "A Mechanism For Instructions Set-Based Thread Execution on a Plurality of Instruction Sequencers."

It should be noted that the sequencers of a system capable of performing embodiments of techniques disclosed herein need not be symmetric. Sequencers may differ in any manner, including those aspects that affect quality of computation. For example, the sequencers may differ in terms of power consumption, speed of computational performance, functional features, or the like.

In the following sections, background information regarding common thread processing is presented in order to provide context for selected embodiments of the present invention. These sections provide background regarding thread environment blocks, thread-local storage, descriptor tables, and structured exception handling for OS-managed threads. Thereafter, selected embodiments of the structure and management of shred environment blocks in accordance with the present invention are presented.

Figure 4:
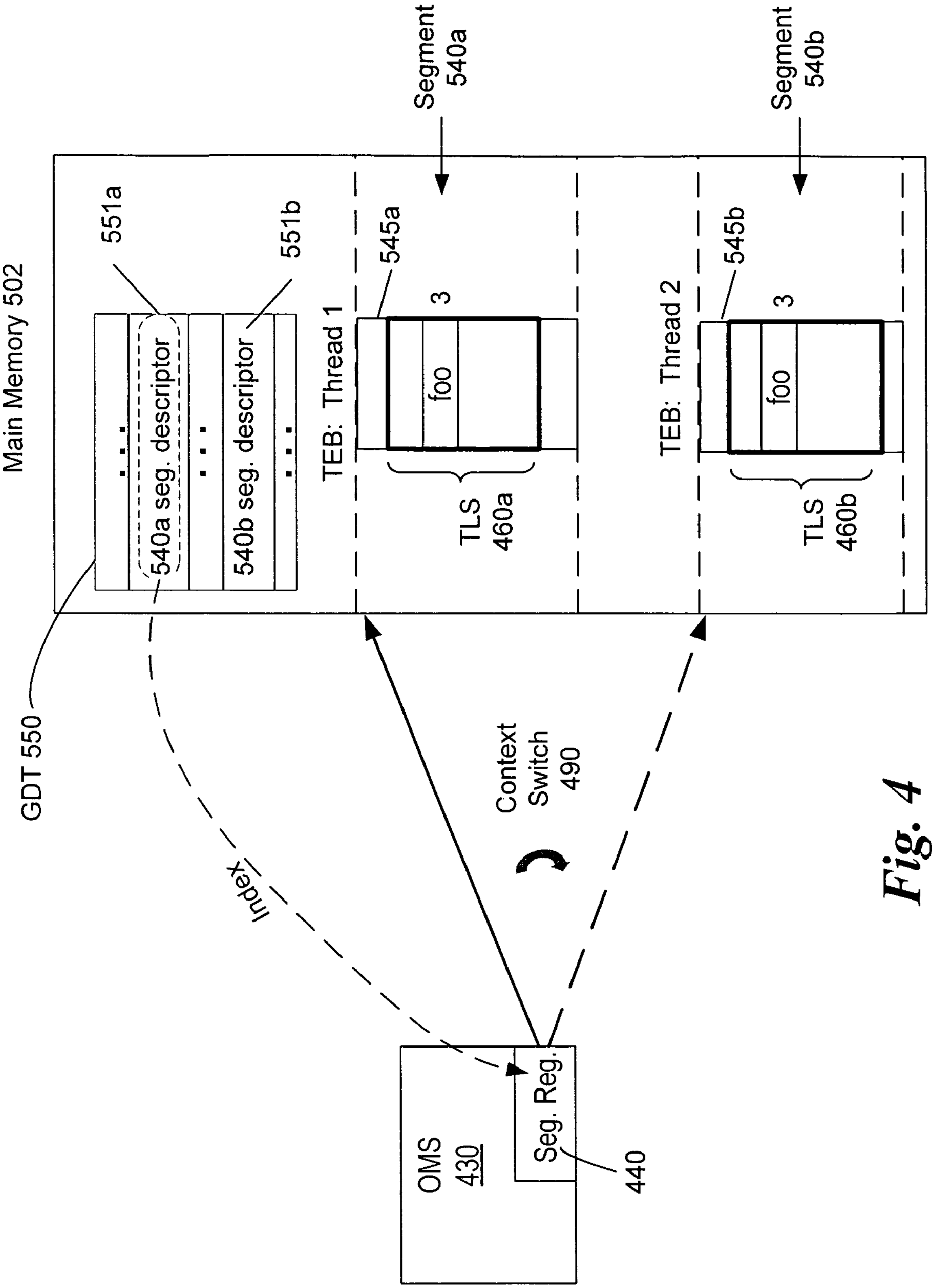
FIG. 4 is a block data flow diagram that illustrates at least one embodiment of a mechanism to maintain thread-specific local data in a multi-threading system.

Thread Environment Blocks for OS-Managed Threads. FIG. 4 is a block diagram illustrating a prior art data management mechanism for OS-managed threads that run on OS-managed sequencers. OS-managed sequencers 430 are referred to herein as "OMS".

FIG. 4 illustrates a thread environment block, or "TEB" 545, which is a data structure created and maintained by the operating system (see, e.g., 140 of FIG. 2) for use in multi-threaded applications. The TEB 545 may, for certain systems, be referred to by other names such as a thread information block or a thread control block. For ease of discussion, the structure 545 is referred to herein as a TEB, but one of skill in the art will recognize that the representation of structure 545 is intended to encompass any similar structure, regardless of a particular system's nomenclature.

For at least some common systems, critical operating system services such as thread-local storage and structured exception handling depend on the presence of a TEB data structure 545 for each thread.

Thread-local Storage. A main function of the TEB 545 in many common systems is to maintain and support the private, also referred to as "local", thread data.

In order to maintain the local thread data, the operating system may reserve a dedicated instance of the TEB 545 upon creation of each thread. The private data for an OS-managed thread may be maintained in a thread local storage ("TLS") area 460*a*, 460*b* for the thread. The TLS area 460 may be maintained in main memory 502 within the TEB segment 540*a*, 540*b*, or it may be referenced by an address pointer contained within the TEB segment 540. That is, the TEB segment 540 may contain a pointer to the TLS area 460 rather than including the actual storage area reserved for the TLS area 460.

The value of each thread-local variable is stored within the TLS area 460 of the TEB data structure 545. The value of each thread-local variable may be accessed through a per-variable key. For example, the compiler may store thread-local variable foo at an offset of 3 within the TLS area 460. Each thread accessing foo reads from index 3 inside of the respective TLS areas 460. Because the TLS area 460 is included within the TEB structure 545, each access to a thread-local data variable is converted into direct accesses of the TLS area 460 in memory.

For at least one embodiment, a register 440 may be utilized to indicate the base address of the current TEB 545. For a first embodiment, the register 440 may hold a direct memory pointer to the TEB structure 545. For example, for an embodiment based on IA-64 architecture, a direct memory pointer to the TEB structure 545 for the correct thread may be maintained in the register 440. For such embodiment, the register 440 may be a general purpose register, such as R13, rather than a dedicated segment register.

Managing thread-local data over contexts switches for an embodiment utilizing direct memory pointers may be performed as follows. Upon a context switch 490, the operating system (see, e.g., 140 of FIG. 2) may update the register 440 with a direct memory pointer that points to the new thread's TEB 504*b*.

However, providing access to the TEB structure 545 on other platforms (such as, e.g., IA-32 platforms) is more complex. For at least one alternative embodiment, the register 440 may be implemented as a segment register. A sequencer's 430 segment register 440 may contain a value that indicates the currently-executing thread's TEB segment 540*a*. Upon a context switch 490, the operating system (see, e.g., 140 of FIG. 2) may update the value in the segment register 440 to indicate the second thread's TEB segment 540*b* via an index into a global descriptor table 550 (described immediately below).

Descriptor Tables. For embodiments that use the segment register approach, the value in the segment register 440 may be an index into a descriptor table 550 rather than a direct memory pointer. For such embodiments, the TEB structure 545 is maintained in a segment of memory 540 defined by the operating system (see, e.g., 140 of FIG. 2). A segment descriptor 551 describes this segment of memory. A segment is a block of memory that starts at a fixed base address and has a set length. Each memory reference includes both a segment value and an offset value. The offset value is the location relative to the base address of the segment.

FIG. 4 illustrates that a segment descriptor 551*a*, 551*b* describing the each segment 540 for a TEB 545*a*, 545*b* is stored in a global descriptor table 550. The global descriptor table (GDT) 550 is a table of descriptors that may be stored in main memory 502. Each descriptor 551 stored in the GDT 550 contains the complete information about a segment. A segment descriptor may include (among other information) the start address of the segment, the length of the segment and the access rights for that segment.

The index into the global descriptor table 550 that accesses the descriptor 551 for the TEB 540 segment for a current thread is kept in one of the sequencer's 430 registers 440. For an embodiment based on IA-32 architecture, the register 440 may be a segment register (for example, the FS segment register is used by the Windows OS and the GS segment register is used by the Linux OS on the IA-32 architecture).

For example, FIG. 4 illustrates that a descriptor 551*a* for the segment 540*a* for a TEB 545*a* for Thread 1 may be maintained in the global descriptor table 550 and that an index into the GBT 550 for the descriptor 551*a* 540*a* may be stored in the segment register 440 while Thread 1 is active on the OMS 430.

To directly access the TEB data structure 545, therefore, a programmer may specify an index into the TEB segment 540. For example, for a WINDOWS operating system running on an IA-32 platform, "mov eax, FS[0]" may load into the EAX register the first word from the TEB segment 540 for the current thread.

FIG. 4 illustrates that, for a context switch 490 from Thread 1 to Thread 2 on OMS 430, the contents of the segment register 440 may be updated. That is, an index into the GDT 550 that accesses the descriptor 551*b* for the segment 540*b* that holds the TEB 545*b* for Thread 2 may be loaded into the segment register 440.

For at least some systems, there are at least two main tables in memory 502 that store segment descriptors. (A third type of descriptor table, related to interrupts, is outside the scope of this discussion). The first type of descriptor table is the GDT 550, described above. This descriptor table 550 may be equally accessible from all processes. The global descriptor table contains descriptors that are normally available to all tasks in the system. Generally, these are tasks used by the operating system.

In addition, a descriptor table may be created for a task of a given process. These tables are referred to as local descriptor tables (LDT) and are discussed in further detail below in connection with FIG. 8.

Structured Exception Handling

In addition to supporting thread-local data, the TEB 545 may also support structured exception handling ("SEH"). SEH is an OS-provided service, complemented with support from the compiler, for handling exceptional events that occur during program execution. Such exceptional events may include, for example, divide-by-zero errors, privilege violations, and the like.

Figure 5:
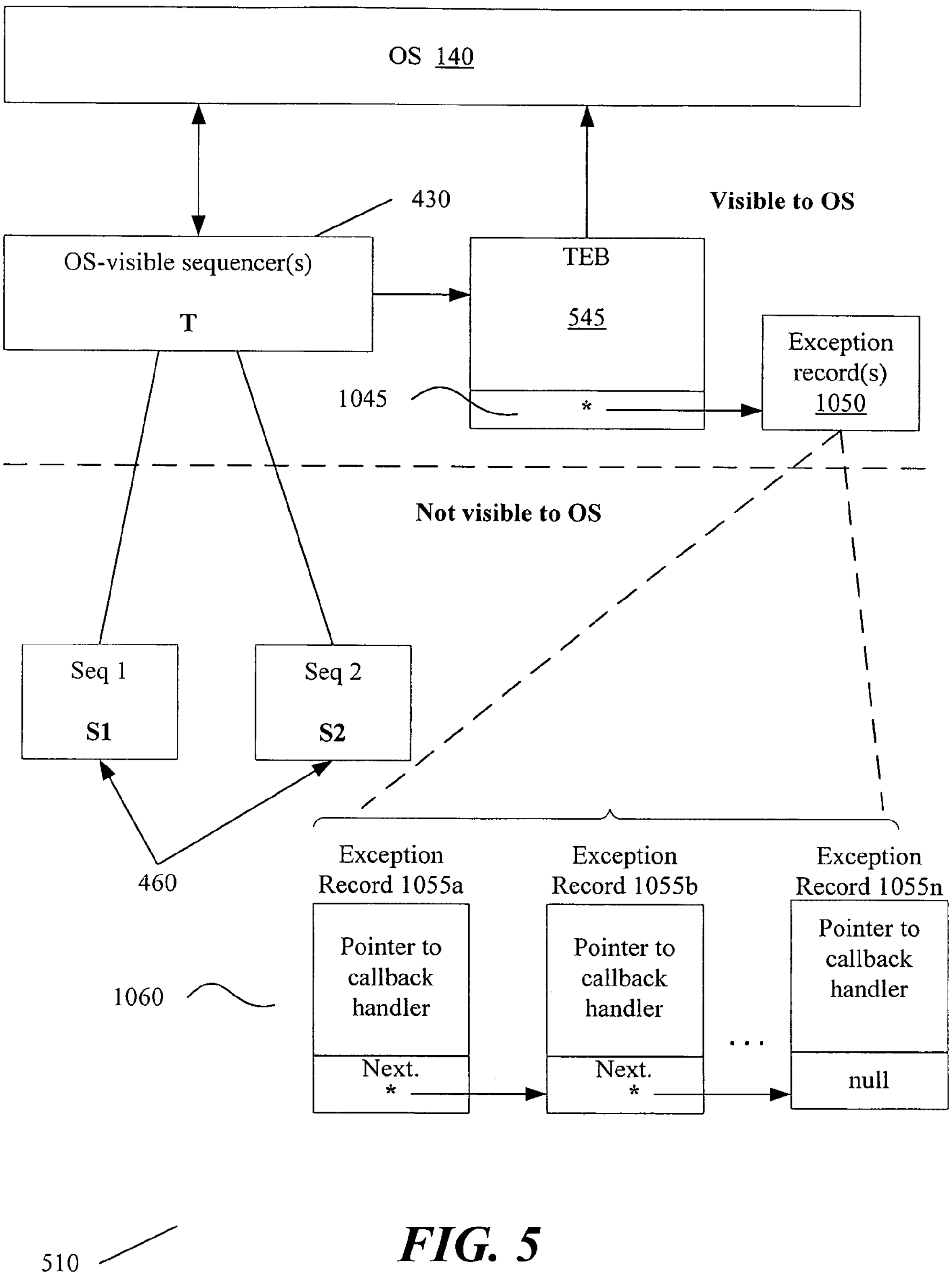
FIG. 5 is a block diagram illustrating at least one embodiment of data structures utilized for structured exception handling.

FIG. 5 illustrates at least one common embodiment of structured exception handling records for OS-managed threads (such as, e.g., "T") that run on an OMS 430. An application programmer may utilize structured exception handling in code to facilitate user-provided handling of certain exceptional events that occur while executing the code in user mode, rather than relying on the operating system 140 to run a default handler to handle the exceptions.

Commonly, to invoke structured exception handling, an application programmer may include instructions in the code that registers a callback function with the OS 140. In turn, the OS 140 performs the callback when it encounters an exception in user mode during execution of the code, thus allowing the user mode application itself to handle the exception that happened when the application was executing.

FIG. 5 illustrates that one of the fields of the TEB 545 may be a pointer 1045 to one or more exception registration records 1050. The exception registration record may be a single record, or may be a structure (table, array, linked list) of multiple records 1055*a*, 1055*b* . . . 1055*n*. For at least one embodiment, the registration records 1050 may be a linked list 1060 of records, each of which points to an exception handler routine.

The compiler may use try/except syntax to insert, or "register", exception handlers into the linked list 1060 pointed to by the TEB 545. This registration process, specified by the try/except syntax, is transformed into direct reads from, and writes to, the TEB 545. When an exception occurs, the SEH service of the OS 140 searches the linked list 1060 of user-supplied exception handlers to determine the next course of action.

The structured exception handling mechanism 510 illustrated in FIG. 5 is thus a dynamic, OS-supported mechanism that permits registration of a callback handler routine that is to be invoked to transfer control from the operating system 140 to the user-level exception handler to handle certain specified user-mode exceptions. However, because the OS 140 does not provide a TEB 545 for shreds that run on OS-sequestered sequencers 460, SEH is not supported for shreds by the mechanism 510 illustrated in FIG. 5.

That is, FIG. 5 illustrates a TEB 545 that has been allocated for the main thread T by the operating system 140. However, FIG. 5 further illustrates that no TEB has been allocated by the operating system 140 for either of the two shreds (S1 and S2) running on sequestered sequencers 460 ("Seq 1" and "Seq 2", respectively) because they are not visible to the OS 140.

Figure 6:
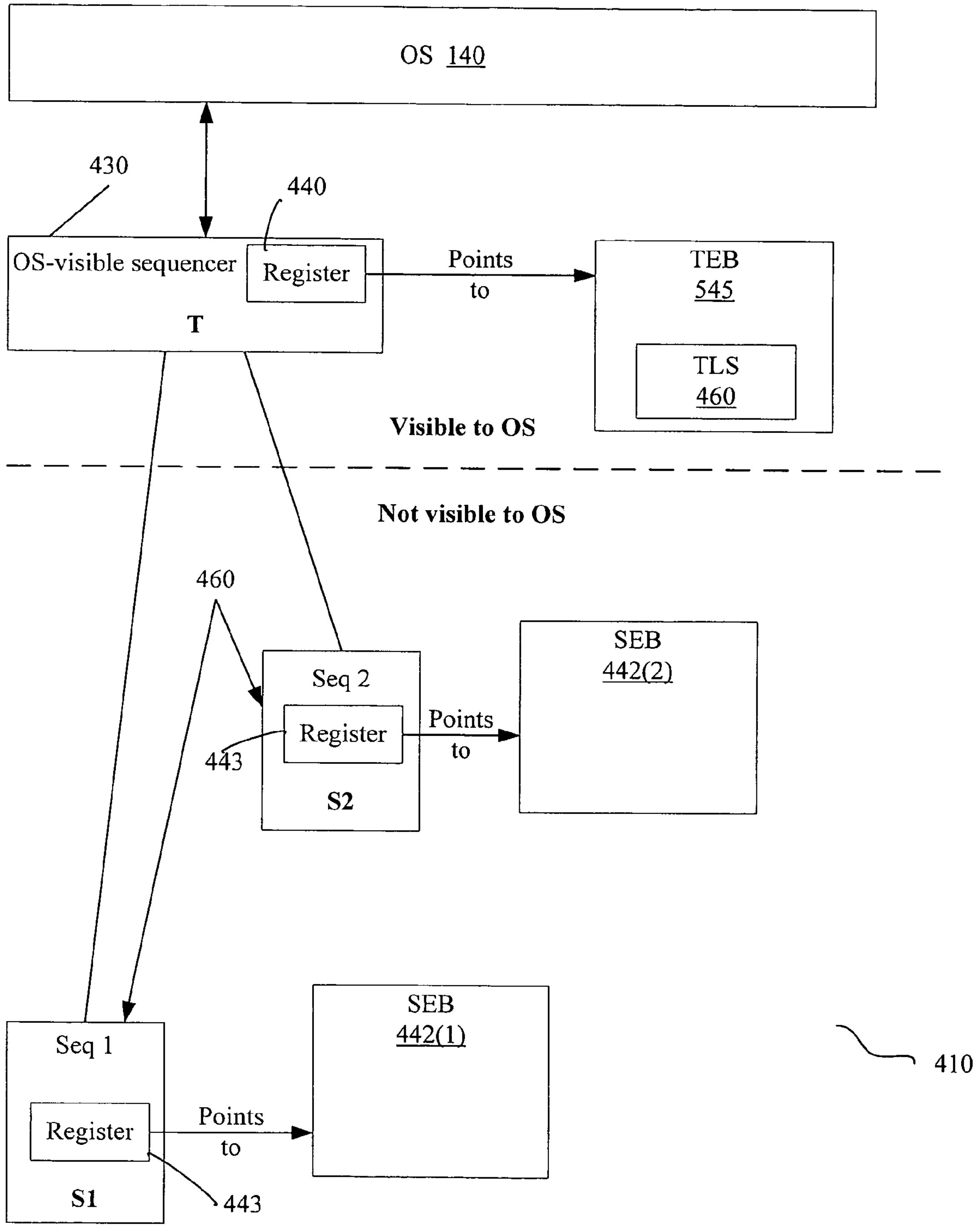
FIG. 6 is a block diagram illustrating a mechanism to maintain shred-specific local data for a multi-threading system that includes one or more sequestered sequencers.

Shred Environment Blocks. Reference is now made to FIG. 6, which is a block diagram illustrating at least one embodiment of a data management mechanism for shred-local data in a multi-shredding system 410. The embodiment of the multi-shredding system 410 illustrated in FIG. 6 includes one or more OMS sequencers 430 that are visible to, and controlled by, operating system 140.

FIG. 6 illustrates that the multi-shredding system 410 also includes one or more sequencers (Seq 1, Seq 2) that are sequestered from the operating system 140. The sequestered sequencers (Seq 1, Seq 2) are collectively referred to in FIG. 6 as Application Managed Sequencers ("AMS") 460.

The system 410 may thus include multiple sequencers 460 that may be managed by an application developer's code, outside of operating system control. The developer may utilize in his code instructions that can cause concurrent execution of streams of instructions, or "shreds", on the sequestered sequencers 460. Shreds running on the OS-sequestered sequencers 460 do not commonly have access to a valid TEB instance 545, because the operating system 140 typically reserves an instance of the TEB 545 only upon creation of native threads, but not for shreds.

For at least one embodiment, the sequencers 430, 460 illustrated in FIG. 6 may differ in terms of functionality. An example of functional asymmetry illustrated in FIG. 6 shows that at least one sequencer 430 may be visible to the OS 140 and may therefore be capable of performing "ring 0" operations such as performing system calls, servicing a page fault, and the like.

On the other hand, one or more other sequencers 460 may be sequestered from the OS 140, and therefore be incapable of performing ring 0 operations. However, this is just one example of functional asymmetry. The sequencers 430, 460 of a multi-sequencer system 410 may also differ in any other manner, such as dimensions, word and/or data path size, topology, memory, power consumption, number of functional units, communication architectures (multi-drop bus vs. point-to-point interconnect), or any other metric related to functionality, performance, footprint, or the like.

For the sample embodiment illustrated in FIG. 6, each of the sequestered sequencers 460 have been initialized to be able to execute shreds (e.g., S1 and S2) associated with a thread. The example illustrated in FIG. 6 shows two shreds, S1 and S2, that have been generated by a thread, T, which is running on an OS-visible sequencer 430. The shreds S1 and S2 have been scheduled to execute on sequestered sequencers Seq 1 and Seq 2, respectively.

Because the system 410 illustrated in FIG. 6 allows a programmer to manage execution of shreds, S1 and S2, on AMS sequencers Seq 1, Seq 2 outside control of the operating system 140, the system 410 includes a mechanism to create and manage data structures 442 to maintain shred-local data for the shreds S1, S2. Such data structures are referred to herein as shred environment blocks ("SEB") 442(1), 442(2).

There are many options for the structure, organization and management of a shred environment block 442. For the embodiments described herein, the structure, organization and management were designed with some specific goals in mind.

The first goal is to provide support for shred-local data in a manner that supports ease of programming and the relatively seamless porting of applications that were written for a traditional threading environment into a multi-shredding environment. Thus, one of the motivations for the SEB 442 structure is to seamlessly facilitate code that contains explicit and/or implicit access to the TEB data structure. By using the proposed SEB structure, code with explicit and/or implicit TEB accesses may execute on both an OS managed sequencer (OMS) 430 and an application managed sequencer (AMS) 460 without source code transformations or even recompilation of an existing binary. For example, code that implicitly accesses the TLS area 460 through a compiler directive for thread local data can be executed on both an OMS and an AMS without modification; in the absence of an SEB structure 442, the code would require modification to be able to execute on an AMS.

The second goal is accomplished by mechanisms, as described below, to synchronize the SEB and TEB state when migrating code between an OMS and an AMS. In addition, the mechanism also provides for synchronizing state when switching contexts from one shred to another on an AMS.

SEB and Shred-Local Storage.

Regarding the first goal, the structure of embodiments of the SEB 442 described herein has been designed in order to emulate the design of a commonly-known TEB 545 structure. In this manner, a programmer familiar with a TEB 545 may understand the structure of the SEB 442 without significant additional effort. Thus, the location of each field in the SEB 442 emulates the organization of such fields in the TEB 545.

Figure 7:
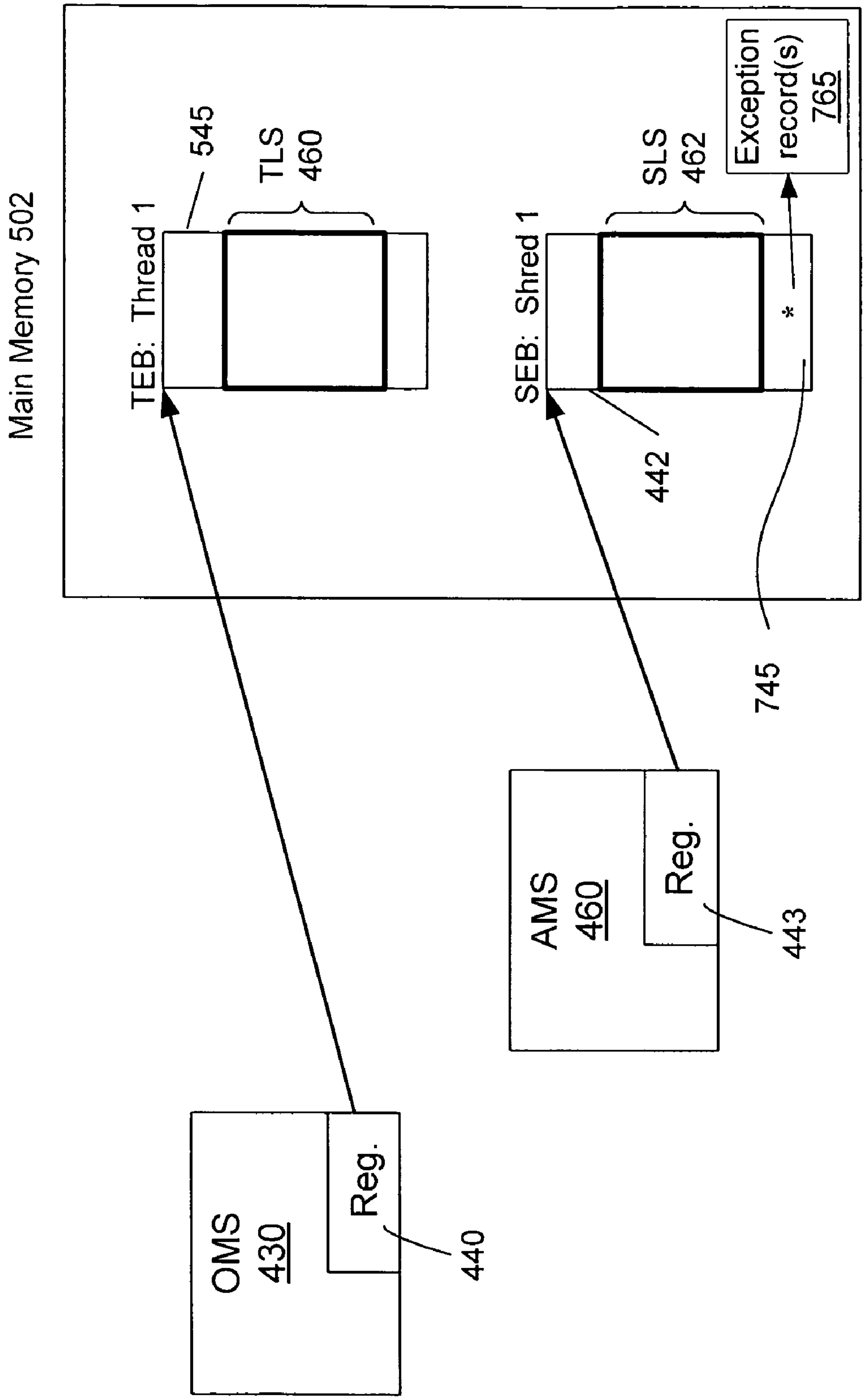
FIG. 7 is a block diagram that illustrates at least one embodiment of a mechanism to maintain shred-specific local data in a multi-threading system using direct memory pointers.

FIG. 7, which is a block diagram illustrating at least one embodiment of a data structure to maintain shred-specific local data in a multi-shredded system, illustrates an SEB structure 442. FIG. 7 illustrates that the private data for a shred may be maintained in a shred local storage ("SLS") area 462 within the SEB structure 442.

The organization of data within the SEB structure may be based, for example, on the structure of the thread environment block 545. For example, the organization of data of the SEB 442 may be based on a well-known implementation for running 32-bit applications for a WINDOWS operating system, called Win32. For example, the third word in the TEB structure 545 of the Win32 environment holds the starting address of the thread's stack. Accordingly, the third word of the SEB 442 structure holds the starting address of the shred's stack. In other words, the stack address is maintained at the same offset in the SEB 442 that the programmer is used to for a TEB 545.

In addition to the organization of the data within the SEB 442, it is desirable to provide for accessing the data of the SEB 442 in a manner that is familiar to the user.

For an embodiment that provides a direct memory pointer in register 443, providing access to the SEB 442 structure is straightforward; a system need merely maintain a pointer to the SEB 442 in the Thread Pointer register 443 on the AMS 460. For example, on the IA-64 architecture the software convention is to use register R13 to contain a pointer to the TEB.

Figure 8:
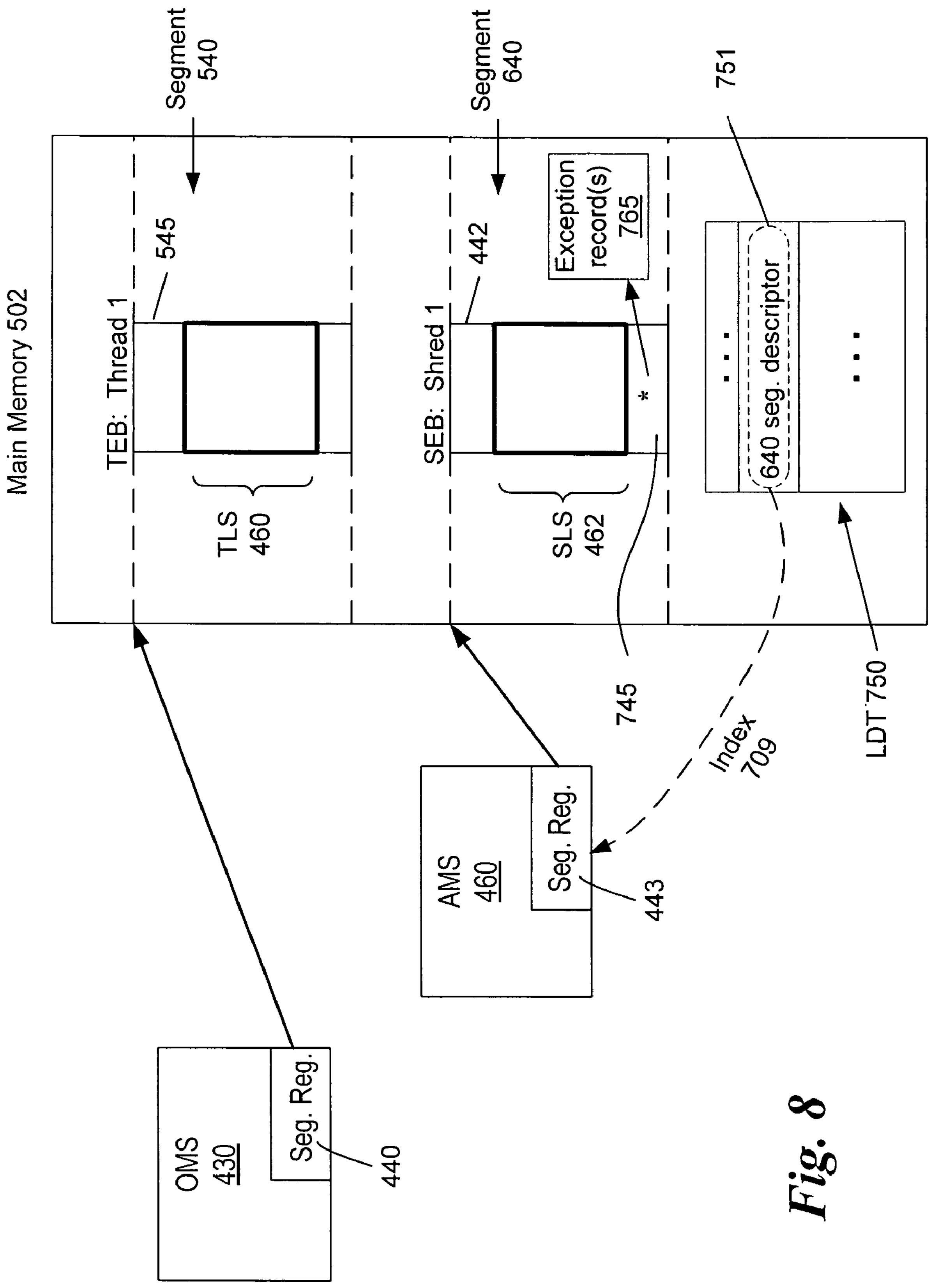
FIG. 8 is a block diagram that illustrates at least one alternative embodiment of a mechanism to maintain shred-specific local data in a multi-threading system using a segment register.

FIG. 8, which is a block diagram of an alternative embodiment that includes a mechanism to provide access to the SEB 442 structure on IA-32 platforms, is now discussed. FIG. 8 illustrates that, for such embodiment, the SLS area 462 for the SEB 442 may be maintained in main memory 502 within an SEB segment 640.

On IA-32-based platforms, the SEB 442, in order to be consistent with common TEB schemes, is contained within a segment of memory 502 referenced by the FS/GS (Win32/Linux32) segment register 443. This segment of memory is referred to herein as a shred local segment 640.

FIG. 8 illustrates a local descriptor table ("LDT") 750. The local descriptor table 750 contains segment descriptors associated with a given task. An LDT 750 can optionally be defined on a per-task basis and is used to partition the addressable range of the task. The LDT table 750 provides a mechanism for isolating a given task's code and data segments from the rest of the operating system or other tasks At least one embodiment of the mechanism illustrated in FIG. 8 provides for defining a segment 640 for SEB structures 442. FIG. 8 illustrates a single SEB segment 640 for AMS 460. As is discussed below, multiple SEB segments 640 may be defined for use each AMS 460. For the time being, however, FIG. 8 is discussed with reference to a single-SEB-per-AMS embodiment.

A descriptor 751 for the segment 640 is created in the Local Descriptor Table (LDT) 750. Such segment 640 and its corresponding descriptor 751 may be created, for at least one embodiment, through an operating system provided service. The operating system service may be invoked by a system call in the shredded code.

The LDT index 709 for the descriptor 751 of the shred local segment 640 is stored in the segment register 443 of the AMS 460. The SEB 442 is then maintained within the local segment 640 of memory 502. In this way, accessing an offset into the shred local segment 640 on an AMS 460 reads data from the SEB 442, whereas accessing the same offset into the thread local segment 540 on an OMS 430 accesses the native thread's TEB 545. Because the same fields/offsets are maintained in the TEB and SEB structures, 545 and 442, respectively, code that accesses the TEB 545 will now work with the SEB 442 without requiring code modification.

In summary, for the embodiments illustrated in both FIGS. 7 and 8 one can see that the TEB 545 is referenced via a register 440 of the OMS 430, while the SEB 442 is referenced via a register 443 of the AMS 460. For both embodiments, shred-local data is stored in, or referenced by, a shred local storage (SLS) area 462. The SLS 462 may be analogous to a thread local storage (TLS) area 460 that is provided in some existing systems.

For the FIG. 8 embodiment, the SLS area 462 in the SEB 442 is maintained at the same segment offset as the TLS area 460. Maintaining the SLS area 462 at the same relative offset as the TLS area 460 allows implicit accesses to the TLS area 460, such as through the compiler directives for TLS storage, to work properly—regardless of whether the code is running on an AMS 460 or an OMS 430. Such approach may be utilized for embodiments based on the Win32-based platform, but one of skill in the art will recognize that the embodiments discussed herein are not so limited. Various embodiments of the mechanisms illustrated in FIGS. 7 and 8 may be utilized, for example, for LINUX operating systems running on IA-32 platforms as well as LINUX and/or WINDOWS operating systems running on IA-64 platforms.

SEB and Structured Exception Handling. FIGS. 7 and 8 illustrate that the SEB structure 442 may include a field to support structured exception handling in a manner similar to that discussed above in connection with FIG. 5. The SEB structure 442 may include, in a field having the same offset as that in a TEB structure 545, a pointer 745 to one or more exception registration records 765. The compiler provides the try/except syntax to the application to insert, or "register", exception handlers into the records 765 pointed to by the pointer 745 in the SEB 442.

This registration process, specified by the try/accept syntax, is transformed into direct reads from, and writes to, the SEB 442. When an exception occurs, the SEH service of the OS 140 searches the linked list of user-supplied exception handlers to determine the next course of action. In this manner, structured exception handling may be supported for shreds.

SEB and Context Switches. A second goal of the design of an SEB 442 management mechanism is facilitate correct code operation across context switches. Context switches may be of several different origins, a few of which are discussed below.

For example, one type of user-level context switch may occur when an OMS sequencer 430 switches from an OS-visible task to a user-level task. Such context switch may occur, for example, when an OMS 430 is available to execute a shred. In such case, a user-level context switch may occur such that the OMS 430 begins to run a user-level shred. Such context switch may be viewed as the "migration" of a shred onto an OMS 430. For at least one such embodiment, the operating system does not schedule the OMS 430 to run the shredded application. Instead, a user-level scheduler may redirect the OMS 430 to pick up a shred.

If the operating system obtains and schedules work on the OMS 430 before the OMS 430 has completed execution of the shred, then another context switch occurs to "migrate" the shred off of the OMS 430. Accordingly, at least some embodiments discussed herein provide for management of the SEB 442 to synchronize the SEB and TEB state when migrating code between an OMS 430 and an AMS 460 (see discussion, below, of FIG. 12).

In addition to shred migration involving an OMS 430, embodiments of an SEB 442 management mechanism may also provide for synchronizing state when switching contexts from one shred to another on a single AMS 460, or from one AMS 460 to another AMS 460. A single-AMS 460 context switch may occur, for example, on a system that provides for a round-robin or other sharing approach for scheduling of shreds on AMSs 460. Such scheduling approach may be utilized, for instance, in a system that supports more shreds (M) than the number of available AMSs (N).

That is, much like the manner in which modern operating systems can manage more threads than the number of available sequencers, a system that supports user-level shreds may manage more shreds (M) than available AMS's (N) through an M:N user-space scheduler. At least one embodiment of such a scheduler is described, for example, in a co-pending patent application bearing Ser. No. 11/027,445, entitled "Mechanism To Schedule Threads On OS-Sequestered Sequencers Without Operating System Intervention."

Such a scheduling approach results in a user-level context switch each time a new shred is switched in to an AMS 460 and the currently-executing shred is switched out. Accordingly, at least some embodiments discussed herein provide for management of multiple SEB's 442 to synchronize state when switching contexts from one shred to another on an AMS 460 (see discussion, below, of FIG. 9).

The paragraphs above illustrate several specific examples of the general proposition that a multi-shredding system should manage SEB's 442 in a manner that provides correct operation across context switches involving shreds. To achieve this goal, there are multiple approaches for creating and maintaining the SEB's 442.

Figure 9:
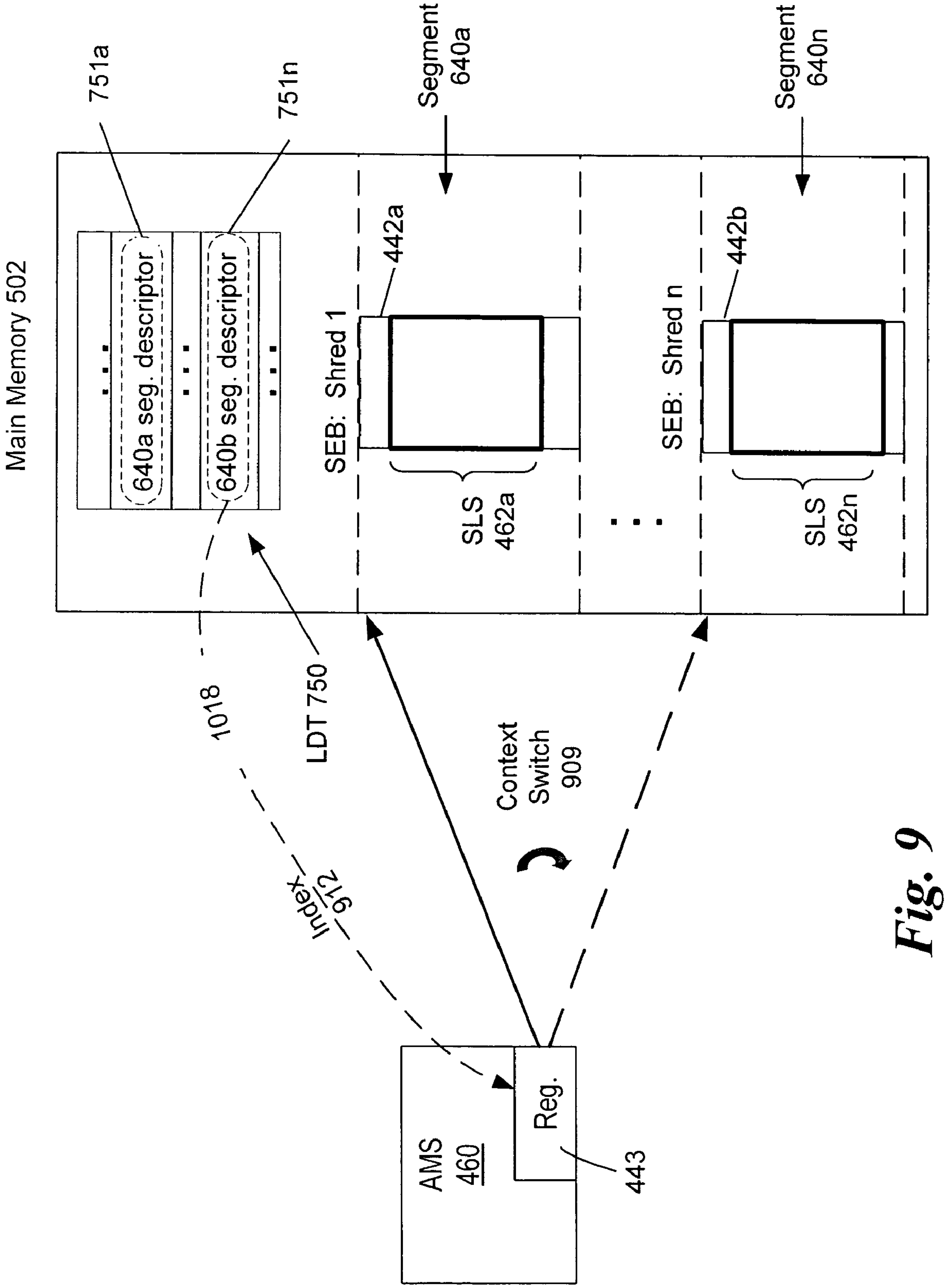
FIG. 9 is a block data flow diagram illustrating data organization and flow for at least one embodiment of a mechanism to maintain state of a shred environment block across context switches.

FIG. 9, which is a block data flow diagram, illustrates one method for creating and maintaining SEB structures 442*a*-442*n*, wherein an SEB 442 is defined for each of n shreds. The FIG. 9 example assumes a scheme along the lines of that shown in FIG. 8—each SEB 442 resides in a local segment 640.

For an alternative embodiment that assumes a scheme along the lines of that shown in FIG. 7, the register 443 illustrated in FIG. 9 is not a segment register but, instead, is designed to store a direct memory pointer to the current SEB structure 442. The remaining discussion of FIG. 9 focuses on an embodiment wherein 443 is a segment register. However, one of skill in the art will understand that a similar SEB maintenance scheme may be employed for an embodiment, such as that illustrated in FIG. 7, that is designed to store a direct memory pointer in register 443.

Figure 10:
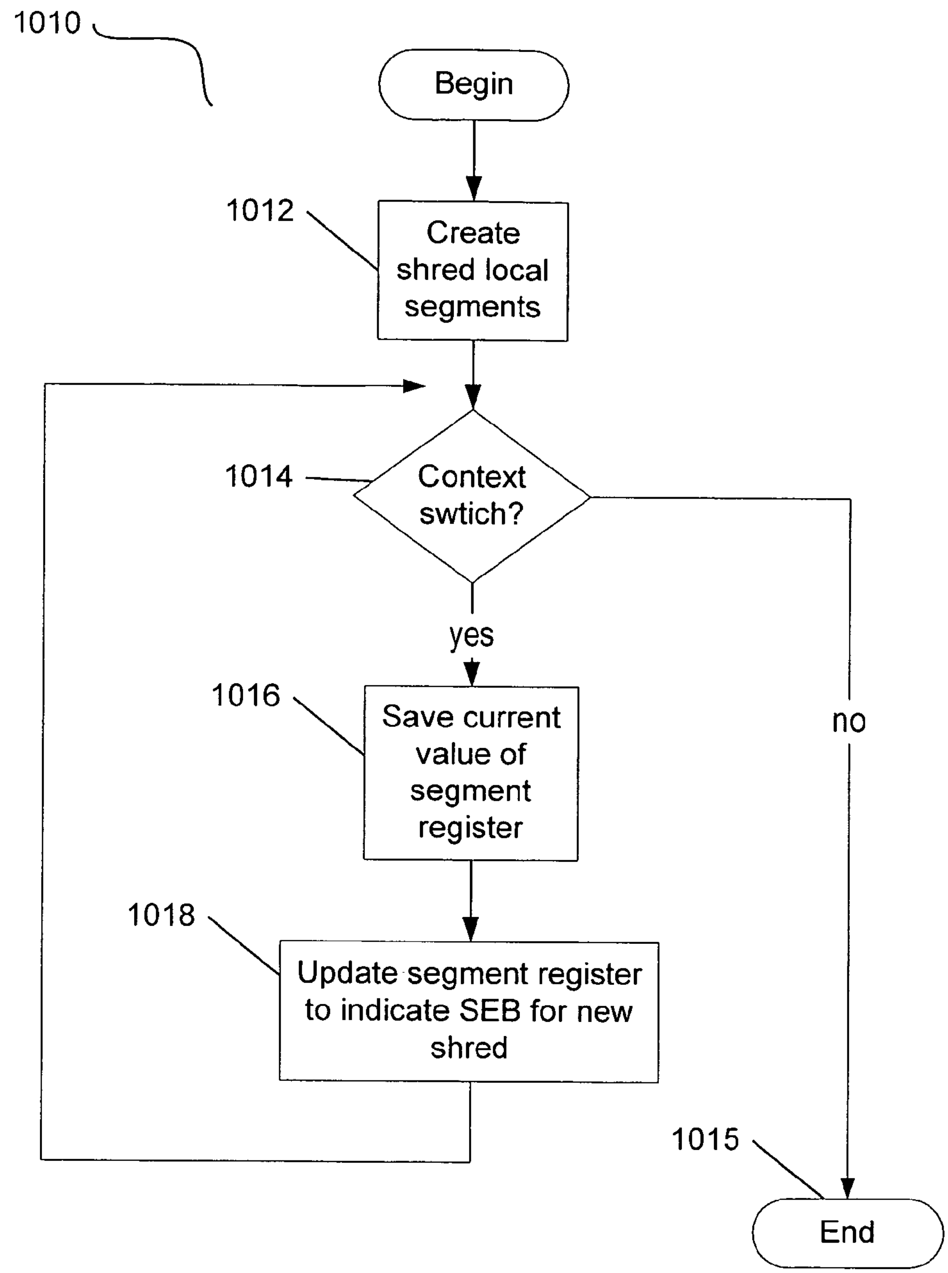
FIG. 10 is a flowchart illustrating at least a first embodiment of a method for maintaining state for a shred environment block across a context switch.

FIG. 9 is discussed in conjunction with FIG. 10, which is a flowchart illustrating at least one embodiment of the SEB management method 1010 whose data flow is illustrated in FIG. 9. The method 1010 of FIG. 10 may be performed by a user-level scheduler that schedules shreds.

FIG. 10 illustrates that an operating system call to create the local segments 640*a*-640*n* represents an initial operation 1012 of the method 1010 illustrated in FIG. 10. Thus, a shred load segment 640*a*-640*n* is created for each SEB 442*a*-442*n*, respectively. Processing then proceeds to block 1014.

At block 1014, it is determined whether a context switch on the AMS 460 is desired. In order to discuss the example shown in FIG. 9, it is assumed for purposes of discussion that a context switch 909 is desired at block 1014 to switch out Shred 1 from the AMS 460 and to switch in Shred n. Accordingly, processing proceeds from block 1014 to block 1016. (If no context switch is desired, processing would end at block 1015).

For a context switch 909, the contents of the local segment register 443 for the current shred are saved to a storage location at block 1016. For the example shown in FIG. 9, the initial value of the segment register 443 is an index associated with the descriptor 751*a* for the shred local segment 640*a* associated with Shred 1. The contents of register 443 may be saved at block 1016 in a manner that associates it with the proper task. Processing then proceeds to block 1018.

At block 1018 the segment register 443 is loaded with an index 912 identifying the descriptor 751*n* for the segment 640*n* for the new shred that is being switched in. For the example shown in FIG. 9, the segment register 443 is loaded at block 1018 with an index associated with the descriptor 751*n* for the shred local segment 640*n* associated with Shred n.

A later context switch to switch Shred 1 onto an AMS 460 triggers operations 1016 and 1018 again, such that the stored value for Shred 1 is returned to the segment register 443.

Processing for the method 1010 then ends at block 1015. As is illustrated by the discussion above, the creation of an SEB 442 for each shred has the result that only the contents of the register 443 are saved/restored for context switches, but the contents of the shred-specific SEB 442 need not be saved and restored for context switches. This is because each shred has its own SEB instance 442*a*-442*n*.

An alternative approach is to define only one SEB 442 for each AMS 460. Such approach is generally illustrated in FIG. 7 for an embodiment that uses direct memory pointers in the register 443. Similarly, such approach is generally illustrated in FIG. 8 for an embodiment that utilizes register 443 as a segment register. For such embodiments, a shred context switch involves saving and restoring the contents of each shred's SEB structure 442 each time a shred context switch occurs.

Figure 11:
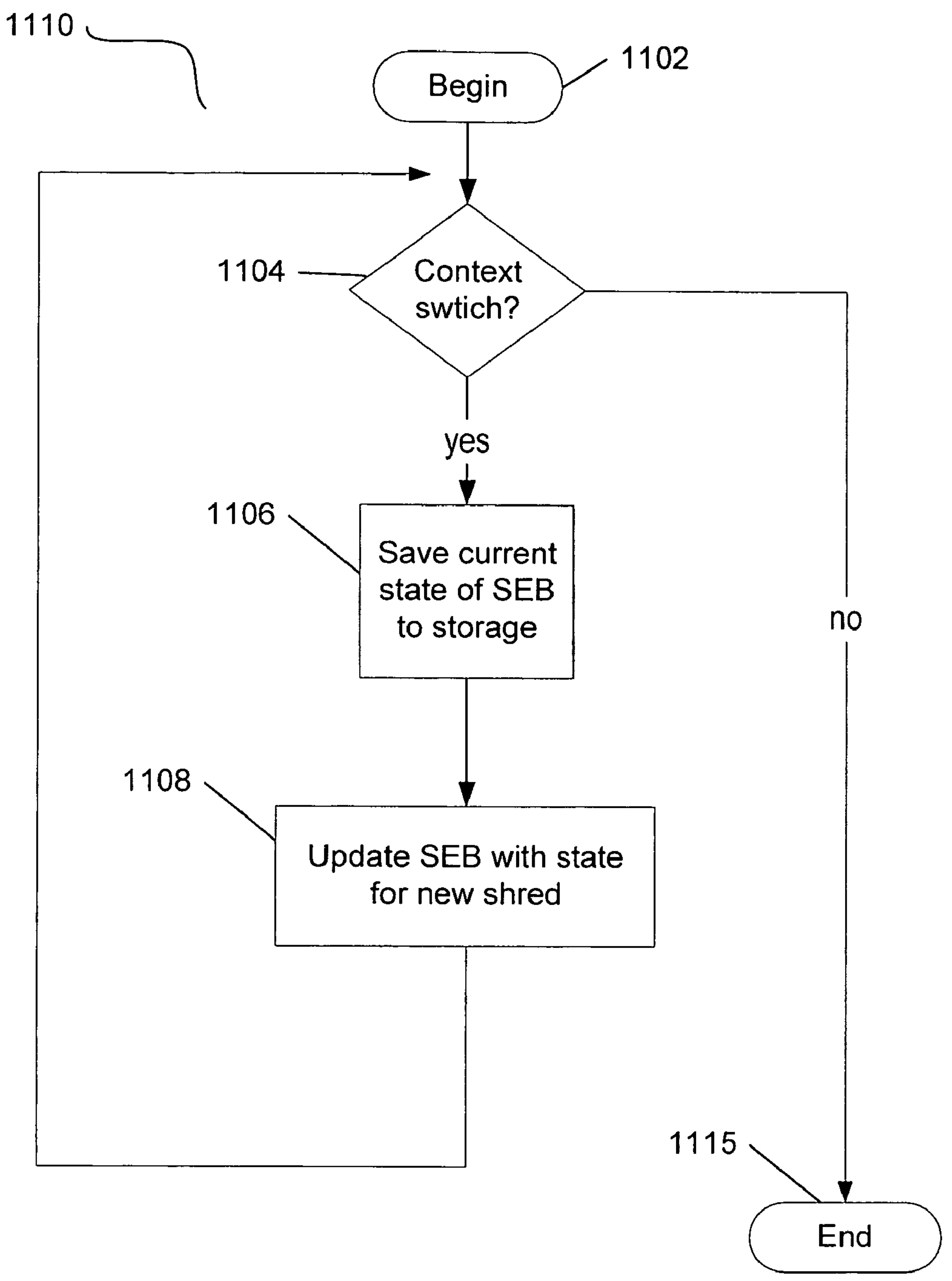
FIG. 11 is a flowchart illustrating at least a second embodiment of a method for maintaining state for a shred environment block across a context switch.

FIG. 11 is a flowchart illustrating at least one embodiment of a method 1110 for managing shred-local data across AMS context switches for a system, such as those illustrated in FIGS. 7 and 8, that create only one SEB 442 per AMS 460. FIG. 11 is discussed in conjunction with FIGS. 7 and 8. The method 1110 may be performed, for at least one embodiment, by a user-level shred scheduler.

FIG. 11 illustrates that the method 1110 begins at block 1102 and proceeds to block 1104. If a context switch is detected at block 1104, then processing proceeds to block 1106. Otherwise, processing ends at block 1115.

At block 1106, the current contents of the SEB structure 442 for the shred being switched out may be saved in a storage area, such as a backing store. Processing then proceeds to block 1108. At block 1108, the contents of the SEB structure for the incoming shred may be loaded from a storage area into the SEB structure 442.

A later context switch to switch the original shred onto an AMS 460 triggers operations 1106 and 1108 again, such that the stored state for the Shred 1 shred environment block may be returned to the SEB structure 442. Processing then ends at block 1115.

If, instead of a context switch that involves only AMS resources, the context switch is an AMS-to-OMS or OMS-to-AMS migration situation, then the management of the contents of the SEB structure 442 may include additional considerations. We turn to FIG. 12 for further discussion of such considerations.

Figure 12:
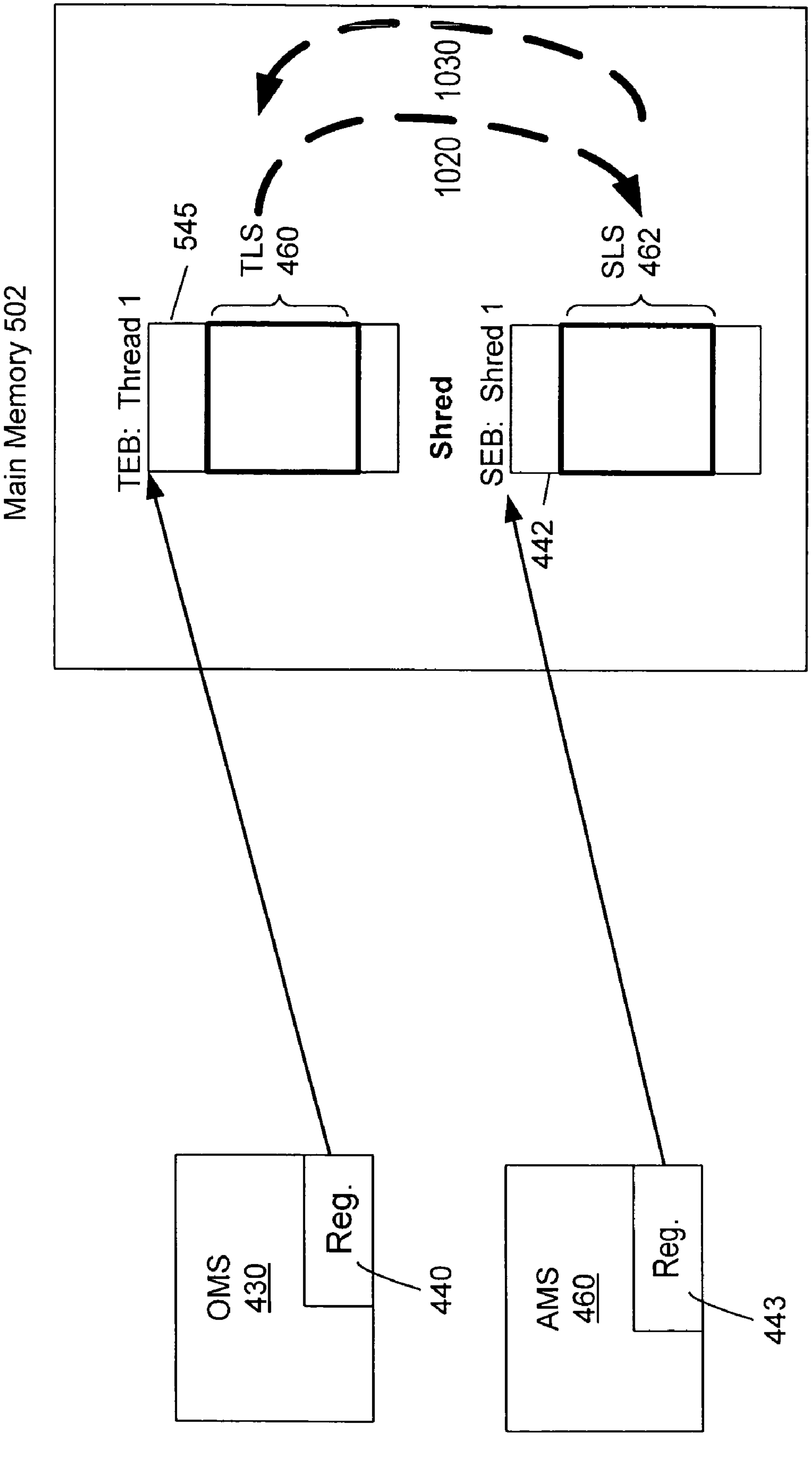
FIG. 12 is a block data flow diagram illustrating a method for maintaining state of a shred environment block across an AMS-OMS-AMS context switch.

FIG. 12 illustrates that certain data is migrated for AMS-to-OMS and OMS-to-AMS migrations in order to facilitate proper operation across these types of context switches. FIG. 12 illustrates data flow 1020 for a first context switch, which represents migration of a shred to an OMS 430. FIG. 12 also illustrates data flow 1030 for a second context switch, which represents migration of the shred from the OMS 430 back to an AMS 460.

For the first context switch, data of the TEB structure 545 for the current thread is copied out (to a backing store, for example). Then, at data migration 1020, a subset of the SEB 442 state is included with the thread state and is written 1020 to the TEB 545. At least some of this subset of the SEB 442 state may be written to the thread local storage area 460 for the TEB 545.

For the second context switch, a subset of the current TEB 545 state is included with the shred state and is written 1030 into the SEB 442. At least a portion of the subset of the current TEB 545 state may be written to the shred local storage area 462. The original data for the TEB structure 545 may then be restored from the backing store.

The data migrations 1020, 1030 illustrated in FIG. 11 are applicable to systems that utilize a direct memory pointer in registers 440 and 443, and are equally applicable to systems that utilize the registers 440, 443 as segment registers.

Figure 13:
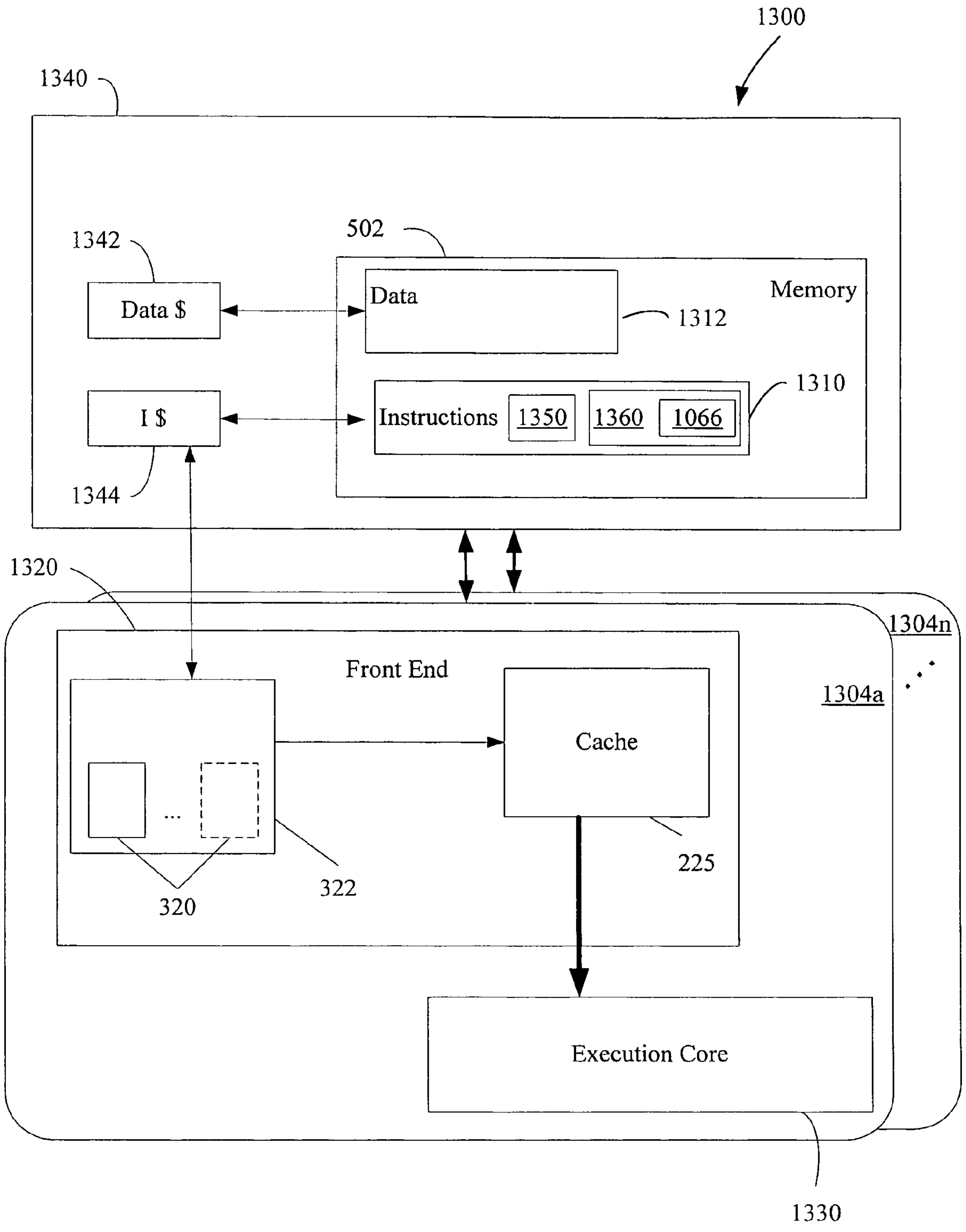
FIG. 13 is a block diagram illustrating at least one embodiment of a system capable of performing disclosed techniques.

FIG. 13 illustrates at least one sample embodiment of a computing system 1300 capable of performing disclosed techniques. The computing system 1300 includes n processor cores 130*a*-1304*n* and a memory system 1340. Memory system 1340 may include larger, relatively slower memory storage 502, as well as one or more smaller, relatively fast caches, such as an instruction cache 1344 and/or a data cache 1342. Although not individually shown, each core 1304*a*-1304*n* may have its own instruction cache 1344 and/or data cache 1342.

Memory system 1340 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1340 may store instructions 1310 and/or data 1312 represented by data signals that may be executed by processor 1304. The instructions 1310 and/or data 1312 may include code and/or data for performing any or all of the techniques discussed herein.

Instructions 1310 may include main thread code 1350. Main thread code 1350 may include instructions to initialize one or more OS-invisible shreds. The initialization instructions of main thread code 1350 may, when executed by a sequencer, cause an OS-invisible sequencer to execute a shred instruction stream while sharing the logical execution environment of the main thread.

For at least one embodiment, instructions 1310 may also include a scheduler routine 1360 to schedule shreds for execution on sequencers. The scheduler routine 1360 may include instructions to perform at least one of the methods 1010, 1110 illustrated in FIGS. 10 and 11, respectively, for context switches. The scheduler routine 1360 may also include logic 1066 to perform the data migrations 1020, 1030 illustrated in FIG. 12.

The processors 1304*a*-1304 need not be symmetrical, but each may include a front end 1320 that supplies instruction information to an execution core 1330. Fetched instruction information may be buffered in a cache 225 to await execution by the execution core 1330. The front end 1320 may supply the instruction information to the execution core 1330 in program order. For at least one embodiment, the front end 1320 includes a fetch/decode unit 322 that determines the next instruction to be executed. For at least one embodiment of the system 1300, the fetch/decode unit 322 may include a single next-instruction-pointer and fetch logic 320. However, in an embodiment where each processor 1304*a*-1304*n* supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment is denoted by dotted lines in FIG. 13.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a tangible machine-readable storage medium, configured for use with a processing system, where the storage medium so configured causes the processing system to operate in a specific and predefined manner to perform the functions described herein.

Sample system 1300 is representative of processing systems based on the Pentium®, Pentium® & Pro, Pentium® II, Pentium® III, Pentium® 4, and Itanium® and Itanium® 2 microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

While particular embodiments of the present invention have been shown and described, it will be obvious to those skilled in the art that changes and modifications can be made without departing from the scope of the appended claims. For example, although registers 440 and 443 have been discussed above as the means for storing pointers or indices related to shred environment blocks, its should be understood by one of skill in the art that any storage means, including a latch, memory location, or other storage mechanism may be utilized instead of a register.

Also, for example, various application programming interfaces and platforms have been mentioned above, including 32-bit and 64-bit WINDOWS platforms as well as 32-bit and 64-bit LINUX platforms However, one of skill in the art will recognize that features of the embodiments described herein may be applied to other environments without departing from the scope of the claims appended below.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A computer-implemented method, comprising:

generating, by an operating system ("OS"), a thread to execute under management of the OS, wherein the operation of generating the thread comprises providing a thread environment block (TEB) for the thread;

generating, by an application-managed thread unit, a user-level thread ("shred") to execute under management of the application-managed thread unit, wherein:

the application-managed thread unit comprises a user-level application, the operation of generating the shred comprises providing a shred environment block (SEB) for the shred, and the SEB is organized according to an organizational structure of the TEB;

maintaining state data for the shred from the SEB across a context switch from the application-managed thread unit to a thread unit that is managed by the OS;

using the TEB to register an exception handler for the thread;

using the SEB to register an exception handler for the shred; and in response to an exception thrown to the OS from the shred, automatically transferring control from the OS to the exception handler for the shred.

2. The method of claim 1, wherein the operation of maintaining state data for the shred comprises:

saving at least part of the SEB when an active shred becomes inactive.

3. The method of claim 2, wherein the operation of maintaining state data for the shred further comprises:

restoring at least part of the SEB when the shred becomes active again.

4. The method of claim 3, wherein:

at least part of the SEB is saved to a backing store and restored from the backing store.

5. The method of claim 4, further comprising:

swapping the shred to another application-managed thread unit by restoring at least part of the SEB from the backing store to a shred managed by the other application-managed thread unit.

6. The method of claim 1, wherein the operation of providing the SEB for the shred comprises:

using a system call to obtain a segment descriptor for a segment of memory for the SEB.

7. The method of claim 6, wherein the operation of providing the SEB for the shred further comprises:

loading a value that indicates a base address for said segment of memory into a register from the group consisting of a segment register and a thread pointer register.

8. The method of claim 7, wherein the operation of maintaining state data for the shred across a context switch from the application-managed thread unit to the thread unit that is managed by the OS comprises:

updating the register with a value that indicates a different segment of memory when a context switch occurs.

9. The method of claim 7, wherein:

the value that indicates the base address for said segment of memory is an index into a descriptor table.

10. An article of manufacture comprising a tangible machine-readable storage medium having a plurality of machine-readable instructions, wherein, when the instructions are executed by a processor of a data processing system, the instructions enable the data processing system to perform operations comprising:

after an operating system ("OS") has generated a thread to execute under management of the OS, generating, by an application-managed thread unit, a user-level thread ("shred") to execute under management of the application-managed thread unit wherein:

the operation of generating the thread comprises providing a thread environment block (TEB) for the thread, the application-managed thread unit comprises a user-level application, and the operation of generating the shred comprises providing a shred environment block (SEB) for the shred, wherein the SEB is organized according to an organizational structure of the TEB;

maintaining state data for the shred across a context switch from the application-managed thread unit to a thread unit that is managed by the OS;

using the TEB to register an exception handler for the thread;

using the SEB to register an exception handler for the shred; and in response to an exception thrown to the OS from the shred, automatically transferring control from the OS to the exception handler for the shred.

11. The article of claim 10, wherein:

the SEB comprises a field to hold a pointer to records for structured exception handling.

12. The article of claim 10, wherein the operation of providing the SEB for the shred comprises:

using a system call to obtain a segment descriptor for a segment of memory for the SEB.

13. The article of claim 12, wherein the operation of providing the SEB for the shred further comprises:

loading a value that indicates a base address for said segment of memory into a register from the group consisting of a segment register and a thread pointer register.

14. The article of claim 13, wherein the operation of maintaining state data for the shred across a context switch from the application-managed thread unit to the thread unit that is managed by the OS comprises:

updating the register with a value that indicates a different segment of memory when a context switch occurs.

15. The article of claim 13, wherein:

the value that indicates the base address for said segment of memory is an index into a descriptor table.

16. The article of claim 10, wherein the operation of maintaining state data for the shred comprises:

saving at least part of the SEB to a backing store when an active shred becomes inactive; and restoring at least part of the SEB from the backing store when the shred becomes active again.

17. The article of claim 10, wherein the instructions enable the data processing system to perform operations comprising:

swapping the shred to another application-managed thread unit by restoring at least part of the SEB from the backing store to a shred managed by the other application-managed thread unit.

18. A data processing system comprising:

a processor;

a storage medium responsive to the processor; and instructions in the storage medium which, when executed by the processor, enable the data processing system to perform operations comprising:

after an operating system ("OS") has generated a thread to execute under management of the OS, generating, by an application-managed thread unit, a user-level thread ("shred") to execute under management of the application-managed thread unit wherein:

the operation of generating the thread comprises providing a thread environment block (TEB) for the thread, the application-managed thread unit comprises a user-level application, the operation of generating the shred comprises providing a shred environment block (SEB) for the shred, and the SEB is organized according to an organizational structure of the TEB;

maintaining state data for the shred across a context switch from the application-managed thread unit to a thread unit that is managed by the OS;

using the TEB to register an exception handler for the thread;

using the SEB to register an exception handler for the shred; and in response to an exception thrown to the OS from the shred, automatically transferring control from the OS to the exception handler for the shred.

19. The data processing system of claim 18, wherein the operation of providing the SEB for the shred comprises:

using a system call to obtain a segment descriptor for a segment of memory for the SEB.

20. The data processing system of claim 19, wherein the operation of providing the SEB for the shred further comprises:

loading a value that indicates a base address for said segment of memory into a register from the group consisting of a segment register and a thread pointer register.

21. The data processing system of claim 20, wherein the operation of maintaining state data for the shred across a context switch from the application-managed thread unit to the thread unit that is managed by the OS comprises:

updating the register with a value that indicates a different segment of memory when a context switch occurs.

22. The data processing system of claim 18, wherein the operation of maintaining state data for the shred comprises:

saving at least part of the SEB to a backing store when an active shred becomes inactive; and restoring at least part of the SEB from the backing store when the shred becomes active again.

23. The data processing system of claim 18, wherein the instructions enable the data processing system to perform operations comprising:

swapping the shred to another application-managed thread unit by restoring at least part of the SEB from the backing store to a shred managed by the other application-managed thread unit.

* * * * *

UNITED STATES PATENT AND TRADEMARK OFFICE

CERTIFICATE OF CORRECTION

PATENT NO. : 8,079,035 B2
APPLICATION NO. : 11/321763
DATED : December 13, 2011
INVENTOR(S) : Richard A. Hankins et al.

It is certified that error appears in the above-identified patent and that said Letters Patent is hereby corrected as shown below:

On the Title page, in column 2, in Item (57), in line 5 of the paragraph after the heading "Abstract," the text "local data and" is corrected to state "local data; and".

In the drawings, on sheet 10 of 13, in Figure 10, in item no. 1014, "swtich" is corrected to state "switch".

In the drawings, on sheet 11 of 13, in Figure 10, in item no. 1104, "swtich" is corrected to state "switch".

Signed and Sealed this
Sixth Day of March, 2012

David J. Kappos

David J. Kappos
*Director of the United States Patent and Trademark Office*